United States Patent
Yamazaki et al.

(10) Patent No.: US 6,432,458 B1
(45) Date of Patent: *Aug. 13, 2002

(54) ENZYME PREPARATIONS AND PROCESS FOR PRODUCING NOODLES

(75) Inventors: Katsutoshi Yamazaki; Shoji Sakaguchi, both of Kawasaki; Takahiko Soeda, Tokyo, all of (JP)

(73) Assignee: Ajinomoto Co., Inc, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,749

(22) Filed: Apr. 5, 1999

(30) Foreign Application Priority Data

Apr. 8, 1998 (JP) .......................... 10-095901
Feb. 22, 1999 (JP) .......................... 11-042613

(51) Int. Cl.⁷ ............................................... A21D 2/00
(52) U.S. Cl. ........................ 426/18; 426/52; 426/618
(58) Field of Search ................... 426/18, 7, 28, 426/49, 52, 451, 615, 618, 496

(56) References Cited

U.S. PATENT DOCUMENTS

| | | | |
|---|---|---|---|
| 3,762,931 A | * 10/1973 | Craig | .................. 426/557 |
| 4,917,904 A | 4/1990 | Yasuhiko | |
| 4,990,349 A | * 2/1991 | Chawan | .................. 426/243 |
| 5,055,310 A | 10/1991 | Nonaka | |
| 5,156,956 A | 10/1992 | Motoki | |
| 5,279,839 A | 1/1994 | Klaus | |
| 5,518,742 A | 5/1996 | Soeda | |
| 5,534,273 A | * 7/1996 | Ito | .................. 426/18 |
| 5,658,605 A | 8/1997 | Soeda | |
| 5,681,598 A | 10/1997 | Kuraishi | |
| 5,750,498 A | 5/1998 | Soeda | |
| 5,907,031 A | 5/1999 | Soeda | |

FOREIGN PATENT DOCUMENTS

EP 0 745 670 12/1996
EP 0 870 434 10/1998

* cited by examiner

*Primary Examiner*—Leslie Wong
(74) *Attorney, Agent, or Firm*—Oblon, Spivak, McClelland, Maier & Neustadt, P.C.

(57) ABSTRACT

A process for producing noodles, which includes using (1) a transglutaminase and (2) a carbonate and/or a reducing agent, and optionally, a protein partial hydrolyzate, in addition to starting materials such as cereal flour as the main starting material, whereby noodles of which the texture is improved by imparting a good balance between firmness and glutinousness to ordinary noodles of which functions such as convenience, restorability, shelf stability and the like are required, are provided.

13 Claims, No Drawings

ENZYME PREPARATIONS AND PROCESS FOR PRODUCING NOODLES

BACKGROUND OF THE INVENTION

1. Field of the Invention

The present invention relates to a process for producing noodles which process improves qualities thereof such as a feeling upon eating, by using (1) a transglutaminase, (2) a carbonate and/or a reducing agent and, optionally, a protein partial hydrolyzate, together with a starting cereal flour, in the production of noodles, and an enzyme preparation containing (1) a transglutaminase, (2) a carbonate and/or a reducing agent and, optionally, a protein partial hydrolyzate as the active ingredient, the enzyme preparation being to improve qualities of noodles and other protein-containing foods.

As the noodles targeted by the present invention, there may be mentioned Japanese noodles such as Japanese udon made from wheat flour as the main starting material, Japanese soba (buckwheat noodle) made from buckwheat flour as the main starting material, and the like, Chinese noodles (including sheets of wonton, shao-mai or siew mai and Japanese gyoza or filled dim sum) obtained by using an alkali agent such as Japanese kansui (a mixture of alkaline salts) or the like, together with wheat flour as the main starting material, pasta made from durum semolina flour, such as spaghetti and the like, and so forth.

2. Background Prior Art

As is well known, there are among noodles, Chinese noodles, Japanese noodles such as soba, udon and the like, pasta (western noodles), and so forth. With respect to these noodles, products produced by various treatments such as boiling, drying, semi-drying, steaming, frying and the like, of raw noodles for improving the instant property or instantaneousness in serving at table thereof, have been put on the market.

These products are expected to provide glutinousness and elasticity simultaneously, namely, viscoelasticity (Japanese koshi, or firmness or chewiness) when eaten, and having a good texture which is provided by raw noodles immediately after boiled. Especially, instant noodles obtained by frying are further expected to have such a quick restoration in hot water that they can be eaten in a short period of time. However, when such instant noodles get quickly restored in hot water, they tend to be less firm. Further, when they are stored for a long period of time, it gives rise to such problems that their appearance is impaired owing to a phenomenon such as browning or the like, and so forth.

Accordingly, these instant noodles are required to have such a good texture that with respect to the feeling upon eating of noodles when restored in hot water, the glutinousness and the elasticity are provided over a long period of time and especially the glutinousness is maintained. Various improvements therefore have been proposed. For example, there is disclosed in JP-B-9-2642859, a method where pregelatinization of starch is conducted using trehalose, followed by drying and then frying treatment and the like. Further, there is disclosed in JP-B-6-9475 another method where raw noodles are boiled, and then steamed with superheated steam to secure a good texture after restoration. Still further, there is disclosed in JP-A-9-86572 a method slit lines by which to form holes for draining hot water are applied to improve restoration in hot water. Furthermore, there is disclosed in JP-B-7-32681 a method where a firm and elastic texture is provided by using a combination of corn starch, green gram starch and alum. Moreover, there is disclosed in JP-B-7-32682 a method where instant noodles are produced by boiling treatment and hot-air drying treatment. There is disclosed in JP-A-6-225744, an instant property or instantaneousness and a shape retention are obtained by incorporating a water-soluble protein powder and a water-swellable protein powder into the raw food material. There is disclosed in JP-A-5-176698 a method where instantaneousness and restorability are provided with a mixing ratio of starting wheat flour and starch.

However, in accordance with the above-described methods where the treatments with the different mixing ratios of the starting flour and other starting materials, and the different conditions of heating, boiling and the like are employed, the resulting noodles are not said to be satisfactory instant noodles having improved noodle qualities. Nor have been the problems such as browning and the like solved. For these reasons, further improvements have been in demand. In other words, it is required to provide to instant noodles a texture closer to that of raw noodles immediately after boiled by improving an elasticity and a glutinousness, i.e., a texture peculiar to instant noodles.

SUMMARY OF THE INVENTION

Under the above-mentioned background of the prior art, it is an object of the present invention to provide noodles of which the texture is improved by imparting a good balance between elasticity and glutinousness to ordinary noodles of which functions such as convenience, restorability, shelf stability and the like are required.

The present inventors have assiduously conducted investigations to achieve the above-mentioned and other objects, and have consequently found that noodles having a firmness with a good balance between glutinousness and elasticity inherent in noodles upon eating, can be produced by conducting an enzyme reaction that improves noodles in their qualities using the enzymatic activity of transglutaminase, in the presence of a carbonate and/or a reducing agent and, optionally, a protein partial hydrolyzate, further that it is possible thereby to prevent the softening of noodle strands in the drying and to improve glutinousness, and still further that it is, in turn, possible to produce various noodles having an excellent texture closer to that provided by raw noodles immediately after boiled. These findings have led to the completion of the present invention.

Accordingly, the present invention relates to an enzyme preparation for noodles and other protein-containing foods, characterized by containing, as the active ingredients, (1) a transglutaminase and (2) a carbonate and/or a reducing agent and further, optionally, a protein partial hydrolyzate, and to a process for producing noodles characterized in that in addition to starting materials such as cereal flour as the main starting material and the like, (1) a transglutaminase and (2) a carbonate and/or a reducing agent and further, optionally, a protein partial hydrolyzate are used.

DETAILED DESCRIPTION OF THE INVENTION

The invention will be successively described in detail below.

First of all, a process for preparing the enzyme preparation of the present invention which can effectively be used in producing noodles and other protein-containing foods, namely, a process for preparing an enzyme preparation characterized by containing, as the active ingredients, (1) a transglutaminase and (2) a carbonate and/or a reducing agent and, optionally, a protein partial hydrolyzate and/or further a pH modifier, will be described first, on the assumption that it is used mainly in the production of noodles.

The transglutaminase is, as is well known, an enzyme that catalyzes the acyl transfer reaction of a γ-carboxyamide group of a glutamine residue in the peptide chain of protein such as wheat gluten. This transglutaminase acts on an ε-amino group of a lysine residue in protein as an acyl receptor to form an ε-(γ-Glu)Lys crosslink intermolecularly between the protein molecules or intramolecularly in the protein molecule, whereby the network structure of wheat gluten is further enhanced.

This transglutaminase includes a calcium-independent one and a calcium-dependent one. Either can be used according to the present invention. As the former one, those derived from microorganisms such as Actinomycetes, Oomycetes, *Bacillus subtilis* or the like can be mentioned (refer to, for example, J-A-64-27471). As the latter one, there may be mentioned those derived from guinea pig liver (refer to, for example, JP-B-1-50382), those derived from animals such as bovine blood, swine blood and the like, those derived from fishes such as salmon, red sea bream and the like (refer to, for example, Seki Nobuo et al., "Nippon Suisan Gakkaishi", vol. 56, No. 1, pp. 125–132 (1990)), those derived from oyster, or so forth. On top of that, those produced through gene recombination (JP-A-1-300889, JP-A-6-225775, JP-A-7-23737 and the like) can be mentioned. In accordance with the present invention, any of these transglutaminases can be used, and the origin and the process for producing the same are not particularly limited. However, in view of the function and the economics in the food applications, the calcium-independent transglutaminases are preferable. For example, the transglutaminases derived from the microorganisms (JP-A-64-27471 mentioned above) meet any conditions, and are said to be optimal at present.

By the way, the activity unit of the transglutaminase referred to concerning the present invention is measured and defined as follows. That is, the reaction is conducted using benzyloxycarbonyl-L-glutaminylglycine and hydroxylamine as substrates. The resulting hydroxamic acid is formed into an iron complex in the presence of trichloroacetic acid, and an absorbance at 525 nm is then measured. A calibration curve is established from the amount of hydroxamic acid, and the amount of the enzyme in which to form 1 μml of hydroxamate for 1 minute is defined as 1 unit, an activity unit of the transglutaminase (refer to JP-A-64-27471 also).

Next, the carbonate which can be used to prepare the enzyme preparation of the present invention will be described.

According to the present invention, the carbonate allows occurrence of carbon dioxide gas through heat treatment in a noodle dough to give the noodle dough a porous structure through the bubbling action within the noodle dough. Further, in the course of further strengthening the network structure of wheat gluten by the action of the transglutaminase crosslinking polymerization, the carbonate is heated to generate carbon dioxide gas, whereby the noodle dough is swollen and the noodle material rapidly absorbs water in, for example, the restoration in hot water.

Examples of the carbonate having such a function include carbonates of alkali metals such as sodium, potassium and the like, carbonates of alkaline earth metals such as calcium, magnesium and the like, hydrogencarbonates of alkali metals such as sodium, potassium and the like, and hydrogencarbonates of alkaline earth metals such as calcium, magnesium and the like. Some of these carbonates are, as is well known, ordinarily used as kansui (mixture of alkaline salts) to increase Japanese koshi or firmness of Chinese noodles in the production thereof. Specific examples thereof include sodium carbonate, potassium carbonate, calcium carbonate, magnesium carbonate and the like. The carbonate to be incorporated in the enzyme preparation of the present invention is not particularly limited. Sodium carbonate, sodium hydrogencarbonate and the like are preferable. In view of heat stability and the like, sodium hydrogencarbonate is preferable.

As the reducing agent, there can be mentioned reducing sugars such as maltose, lactose, glucose and the like, thiol compounds such as glutathione, cysteine and the like, and so forth. In view of the taste, it is especially preferable to use glutathione.

As glutathione, commercial glutathione may be used, and yeast extract containing glutathione in a large amount or the like can also be used.

By the way, according to the present invention, the reducing agent acts on the —S—S— bond of wheat gluten to increase the glutinousness of noodles or the like and impart a desirable texture to noodles.

Further, as the protein partial hydrolyzate, a partial hydrolyzate made from wheat protein, milk protein, soybean protein or the like as a starting material is useful. The partial hydrolyzates of these proteins are not particularly limited so long as the object of the present invention is achieved. Incidentally, according to the present invention, the protein partial hydrolyzate has such effect that it acts on the network structure of the wheat protein to give the noodles a flexible elasticity.

A partial hydrolyzate of wheat protein may be obtained by, for example, partially hydrolyzing wheat protein with an enzyme, an acid, an alkali or the like. Although it is not particularly limited, a wheat protein partial hydrolyzate product having a deamidation rate of from 2 to 85% can be used. The rate of deamidation is generally an index that indicates a degree of formation of α-amino acids which are formed when a protein is hydrolyzed by the catalytic activity of an enzyme, an acid or an alkali. Incidentally, commercial "Glutamine Peptide Composition" (for example, "Glutamine Peptide Composition" supplied by K. K. Canpina Milk Uny Japan) is also a wheat protein partial hydrolyzate, and it is therefore included in what is meant by the wheat protein partial hydrolyzate according to the present invention.

The partial hydrolyzate of a milk protein will be next described. The milk protein here refers to casein, its salt, a whole milk powder, a skim milk powder or the like. Any of these can be used as the starting material, to obtain a milk protein partial hydrolyzate. However, salts such as sodium caseinate and the like are generally appropriate in view of workability and the like. As the milk protein partial hydrolyzate to be used according to the present invention, like the wheat protein partial hydrolyzate, a product obtainable by hydrolyzing a milk protein with an enzyme, an acid, an alkali or the like can be used. Although it is not particularly limited, a milk protein partial hydrolyzate product having a deamidation rate of from 5 to 75% can ordinarily be used.

Next, a partial hydrolyzate of the soybean protein will be described. The soybean protein here refers to a soybean protein isolate extracted from soybeans, a soybean protein concentrate, a soybean powder obtained by pulverizing whole soybeans as such, soybean grits and the like. These are partially hydrolyzed with an enzyme, an acid, an alkali or the like to obtain a soybean protein partial hydrolyzate. A soybean protein partial hydrolyzate product having a rate of hydrolysis (rate of deamidation) of from 5 to 75% can ordinarily be used. However, it is not particularly limited unless the object of the present invention is impaired. A product having a rate of hydrolysis of from 20 to 70% is preferable.

It is not particularly difficult to prepare the enzyme preparation of the present invention containing a transglutaminase and a carbonate and/or a reducing agent and, optionally, a protein partial hydrolyzate as the active ingredients, as described above. The preparation can properly be conducted according to the conventional process known in this field except that a transglutaminase and a carbonate and/or a reducing agent as the essential active ingredients and a protein partial hydrolyzate as the optional ingredient are incorporated.

In the enzyme preparation of the present invention can of course be incorporated food filler(s) such as starch, dextrin, lactose and the like for the reasons of preparations or in view of the convenience in use. Further, a modifier such as starch, modified starch, albumen (egg white), wheat gluten or the like, a thichening polysaccharide, an acidulant and the like that are auxiliary starting materials ordinarily used in the production of noodles, can be used in the enzyme preparation of the present invention, and these are not particularly limited so long as the object of the present invention is achieved. Further, it may contain an enzyme stabilizer (such as calcium chloride, ascorbic acid or the like) or an auxiliary starting material to improve powder characteristics (solubility, dispersibility, prevention of powder scattering and the like) of the enzyme preparation.

Needless to say, it is preferable that the ratio at which to mix a transglutaminase with a carbonate and a reducing agent or a protein partial hydrolyzate which are to be incorporated into the enzyme preparation of the present invention is, for example, a ratio at which to satisfy, at the same time, necessary amounts of the transglutaminase, the carbonate, the reducing agent and the protein partial hydrolyzate in the process for producing noodles according to the present invention as will be later described. Such a mixing ratio is of such that per one unit of the transglutaminase, the carbonate is between 0.0001 to 30 g, the reducing agent is between 0.00001 and 1 g and the protein partial hydrolyzate is between 0.00001 and 10 g.

The enzyme preparation of the present invention can further contain a pH adjusting agent in view of the color and the physical properties of noodles.

The pH adjusting agent is a phosphate used in ordinary noodles or the like. For example, sodiu hydrogenphosphat[0085] can be mentioned. However, it is not particularly limited thereto unless the object of the present invention is impaired.

Now, the enzyme preparation of the present invention naturally imparts glutinousness and elasticity to noodles, as is clear from the above-described functions of the respective ingredients. Further, it is generally useful for protein-containing foods made from cereals such as wheat flour and the like as the main starting material. For example, it imparts a preferable texture to, for example, various noodles, confectionery such as biscuits, cake mixes, cakes and the like, various types of bread, and the like which are foods containing wheat protein, by the crosslinking polymerization of the protein, and it causes the same to exhibit effective functions.

Thus, the enzyme preparation of the present invention has been described mainly with respect to noodles made from cereals such as wheat flour and the like as the main starting material. It goes, however, without saying that the same effect of improving the texture can be given to foods containing proteins which can be substrates of the transglutaminase.

Second, the process for producing noodles of the present invention will be described.

The noodles to be produced by the process of the present invention widely include Chinese noodles (including sheets of Japanese gyoza (filled dim sum), spring roll and wonton), Japanese noodles such as Japanese udon, Japanese soba and the like, pasta (western noodles) such as spaghetti, macaroni and the like, and so forth. Further, raw noodles, boiled noodles, dried noodles, semi-dried noodles, steamed noodles or fried noodles (packed in a cup or the like) and the like which are distribution style different in the degree of instant processing, are widely included therein.

It is not particularly difficult to produce such various types of noodles by the process of the present invention using, in addition to the starting materials such as cereal flour as the main starting material, (1) a transglutaminase and (2) a carbonate and/or a reducing agent and, optionally, a protein partial hydrolyzate. This is because the noodles can be produced according to the conventional process for producing noodles including the types of the starting materials, the mixing ratio and the like, except, in addition to the ordinary starting materials, a transglutaminase and a carbonate and/or a reducing agent and, optionally, a protein partial hydrolyzate are used in the step of forming the noodle dough. Of course, the transglutaminase and the carbonate and/or the reducing agent and, optionally, the protein partial hydrolyzate can also be used in the form of the enzyme preparation (naturally, including a product containing a food filler) of the present invention as described above.

Incidentally, such a process for producing noodles will be outlined, as follows. Noodle dough is formed using various auxiliary starting materials, together with the main starting material cereal flour such as wheat flour, buckwheat flour or the like; the resulting dough is aged (rested), combined, and rolled to obtain a dough sheet (cut to a desired shape at this stage in case of sheets of gyoza, spring roll and wonton); and the resulting sheet dough is further cut to noodle strands. The resulting noodle strands are put in commercial distribution, (a) directly as raw noodles, (b) as dried noodles or semi-dried noodles by being dried, (c) as boiled noodles by being boiled, or (d) as fried noodles by being fried.

Then, the manners how the transglutaminase, the carbonate, the reducing agent and the protein partial hydrolyzate are used, will be mainly described below.

The amount of the transglutaminase to be added (or used), is between 0.01 and 30 units, preferably between 0.1 and 10 units per one gram of the protein present in the starting cereal flour. If the amount added is less than the above-mentioned range, the expected effects cannot be provided with respect to the improvement of the texture of noodles, the physical properties after drying treatment and steaming treatment, prevention of softening of noodles on standing after boiling and the like. If it exceeds the above-mentioned range, the texture of noodles gets notably too hard inconveniently. Thus, neither case can satisfactorily achieve the object of the present invention.

The amount of the carbonate to be added is between 0.0001 and 30 g, preferably between 0.001 and 3 g per one unit of the transglutaminase. If the amount added is less than the above-mentioned range, no effect by the combination with the transglutaminase is observed. While, if it exceeds the above-mentioned range, the texture based on the peculiar hardness provided by the carbonate is give[008e] undesirably. Thus, neither case can satisfactorily achieve the object of the present invention.

Further, the amount of the reducing agent to be added is between 0.001 and 2.0% by weight based on the cereal flour as the main starting material. If the amount added is less than the above-mentioned range, glutinousness is exhibited to a lower extent. If it exceeds the above-mentioned range, glutinousness is increased too much. Thus, neither case can satisfactorily achieve the object of the present invention.

The amount of the protein partial hydrolyzate to be added is between 0.00001 and 10 g, preferably between 0.0001 and 1 g per one unit of the transglutaminase. If the amount added is less than the above-mentioned range, the texture of noodles is the same as that given by the transglutaminase alone, and no additional effect by the combined use is observed. Whereas, if it exceeds the above-mentioned range, a texture with the decreased elasticity peculiar to the protein partial hydrolyzate is provided undesirably. Thus, neither case can satisfactorily achieve the object of the present invention.

Further, a modifier such as starch, modified starch, albumen, wheat gluten or the like, a thickening polysaccharide, acidulant, a pH adjusting agent and the like which are auxiliary starting materials used in the production of noodles as has been mentioned earlier, can be used, and they are not particularly limited so long as the object of the present invention is achieved.

Incidentally, in order to exhibit the enzymatic activity, a mixture of the enzyme and the substrate has to be generally maintained under conditions of temperature, time and the like that are suitable for the enzymatic activity to be exhibited. However, in the production of noodles according to the present invention, the enzymatic activity of the transglutaminase is sometimes exhibited, for example, during the ageing of the noodle dough without special consideration of such conditions. Further, the step of ageing the noodle dough can be conducted under such conditions as required, whereby the enzymatic activity of the transglutaminase is exhibited. Further, the dough sheet obtained by combining and rolling a noodle dough is maintained under such conditions, whereby the enzymatic activity of the transglutaminase can also be exhibited.

Further, in order that carbon dioxide gas may be generated from the carbonate and by the bubbling action thereof, the noodle structure may be made porous (swollen), noodle strands can be cut out from the dough sheet, then steamed and subjected to heat treatment such as frying or the like.

The process for producing noodles of the present invention is, as stated above, a process for producing noodles characterized by using, in addition to the starting materials such as cereal flour and the like as the main starting material, (1) a transglutaminase and (2) a carbonate and/or a reducing agent and optionally, a protein partial hydrolyzate. The following can be mentioned as embodiments of the process for producing noodles of the present invention, in consideration of such points as described earlier on the activities of the transglutaminase and the carbonate.

(a) The sheet dough is subjected to ageing treatment at a temperature of from 0 to 60° C. for 15 minutes or more.

(b) The noodle strands (raw noodles) cut out from the sheet dough are directly handled as a product. In this case, these are put in commercial distribution as raw noodles.

(c) The raw noodles are boiled to provide a product. In this case, the boiled noodles or frozen noodles obtained by freezing the same are put in commercial distribution.

(d) The raw noodles are (semi-)dried to provide a product. In this case, they are put in commercial distribution as (semi-)dried noodles.

(e) The raw noodles are heated with the use of steam to gelatinize the starch on the surfaces alone, providing a product. The resulting noodles are so-called steamed noodles.

(f) The raw noodles are steamed to gelatinize the starch, and then dried to provide a product. The resulting noodles are so-called non-fried instant noodles.

(g) The raw noodles are steamed to gelatinize the starch, and then fried to provide a product. The resulting noodles are so-called instant noodles.

(h) The raw noodles are fried as such to provide a product.

(i) The raw noodles are twice fried, first as such at a low temperature and then at a high temperature to provide a product. The resulting noodles are so-called snack noodles. The snack noodles refer to noodles that have been fried and are eaten in this state.

(j) The raw noodles are steamed, and then followed by twice frying as referred to under (i) above, to provide a product.

(k) The raw noodles are treated with an acid, and then followed by heating, to provide a product.

Further to the foregoing, in order to sufficiently exhibit the activity of the transglutaminase, the noodle strands are cut out from the noodle dough obtained by kneading or mixing the starting materials, and these (raw) noodle strands are then subjected to such two-step frying that these are first fried, e.g., at from 15 to 80° C., preferably from 35 to 55° C. for from 30 to 240 seconds, and then at from 105 to 190° C., preferably from 130 to 160° C. for from 90 to 150 seconds (refer to the above-mentioned (i)). Alternatively, the noodle dough is previously combined and rolled, and the resulting dough sheet is then subjected to such ageing treatment that it is maintained at a temperature of at least 0° C. and at most 65° C. for from 15 minutes to a night, for example. Then, the activity of the transglutaminase is exhibited sufficiently (refer to the above-mentioned (a)). Thereafter, the two-step frying is conducted under the above-mentioned conditions. Further, after the noodle strands are cut out, these are directly (as raw noodles) subjected to the drying step immediately (refer to the above-mentioned (d)) Or, after being steamed, these are, for example, fried first at a low temperature of from 50 to 60° C., and then at a high temperature of from 70 to 190° C. (refer to the above-mentioned (j)). As a result, the water content is reduced, so that the noodles can also be put in commercial distribution in the form of (semi-)dried noodles by being semi-dried or dried. In this manner, according to the present invention, the various types of noodles can be produced as those having a good texture with an elasticity and a glutinousness regardless of the form of the product.

EXAMPLES

The present invention will illustrated more specifically by referring to the following Examples. However, the invention is not limited to these Examples.

Example 1 (Instant Chinese noodles)

(a) Two-thousand grams of semi-strong wheat flour ("Toku No. 1", supplied by Nissin Flour Milling Co., Ltd.) and a solution of 20 g of sodium chloride, 20 g of sodium hydrogencarbonate and 0.5 g of a transglutaminase (specific activity: 1,000 units/g) derived from a microorganism (Streptoverticillium mobaraense IFO 13819) belonging to the genus Streptoverticillium, an actinomycetes, dissolved in 720 g of water were kneaded with a mixer at 76 rpm for 15 minutes. The mixture was sheeted, combined, and rolled in a usual manner using a noodle-making machine (supplied by K.K. Shinagawa Menki Seisakusho). Thereafter, the resulting dough sheet was aged at 20° C. for 60 minutes, cut out with a cutting roll No. 22 (raw Chinese noodles), subjected to steaming treatment for 2 minutes, and fried first at 50° C. for 1 minute and then at 160° C. for 2 minutes to prepare instant Chinese noodles (inventive product). By the way, the amount of the transglutaminase used was 5 units per one gram of the protein present in the wheat flour.

For comparison's sake, instant Chinese noodles were produced in the same manner except that neither transglutaminase nor sodium hydrogencarbonate were used (Control product 1), sodium hydrogencarbonate was used but the transglutaminase was not used (Control product 2), and the transglutaminase was used but sodium hydrogencarbonate was not used (Control product 3).

The respective amounts of the transglutaminase and sodium hydrogencarbonate used to produce the above-mentioned four types of instant Chinese noodles are shown in Table 1 below.

TABLE 1

|  | Transglutaminase unit/g-wheat protein | Sodium hydrogencarbonate % (based on wheat flour) |
| --- | --- | --- |
| Control product 1 | 0 | 0 |
| Control product 2 | 0 | 1 |
| Control product 3 | 5 | 0 |
| Inventive product | 5 | 1 |

Further, with respect to the above-mentioned four types of instant Chinese noodles, the restorability provided 2 minutes after the pouring of hot water was evaluated through tasting, and the results are shown in Table 2.

The organoleptic evaluation here was conducted by the 10 points evaluation method with a panel consisting of 10 expert panelists. That is, each panelist conducted the evaluation according to the standard on the "elasticity", based on 5 points: common, 1 point: very soft, 2 points: fairly soft, 3 points: comparatively soft, 4 points: slightly soft, 6 points: slightly hard, 7 points: comparatively hard, 8 points: hard, 9 points: fairly hard, and 10 points: very hard. The average values were taken up. Further, with respect to the "glutinousness" and the "overall", the same evaluation was conducted on the basis of 5 points: standard. Simultaneously, the profile evaluation was conducted.

TABLE 2

|  | Elasticity (pts.) | Glutinousness (pts.) | Overall (pts.) | Profile evaluation |
| --- | --- | --- | --- | --- |
| Control product 1 | 3.0 | 3.5 | 2.0 | Soft |
| Control product 2 | 5.0 | 3.0 | 4.5 | Soft and elastic |
| Control Product 3 | 7.0 | 5.0 | 6.5 | Highly elastic and glutinous |

TABLE 2-continued

|  | Elasticity (pts.) | Glutinousness (pts.) | Overall (pts.) | Profile evaluation |
| --- | --- | --- | --- | --- |
| Inventive product | 8.0 | 5.5 | 7.5 | Highly elastic, glutinous, quickly restored in hot water, and good |

The product with the transglutaminase and sodium hydrogencarbonate added (inventive product) had both the elasticity and the glutinousness, and was very good.

(b) Further, four types of instant Chinese noodles were produced in the above-mentioned manner except that the conditions of steaming and frying were somewhat changed. That is, the noodle was aged at room temperature (20° C.) for 60 minutes, thereafter steamed for 3 minutes, and fried at 50° C. for 2 minutes and then immediately at 160° C. for 2 minutes. These noodles were evaluated by tasting 3 minutes after the pouring of hot water. The results are shown in Table 3 below.

TABLE 3

|  | Elasticity (pts.) | Glutinousness (pts.) | Overall (pts.) | Profile evaluation |
| --- | --- | --- | --- | --- |
| Control product 1 | 3.0 | 3.5 | 3.0 | Soft |
| Control product 2 | 6.0 | 3.0 | 5.8 | Soft and elastic |
| Control Product 3 | 7.5 | 5.0 | 7.0 | Highly elastic and glutinous |
| Inventive product | 8.4 | 5.0 | 8.0 | Highly elastic, glutinous, quickly restored in hot water, and good |

In this evaluation, the best results were provided when both the transglutaminase and sodium hydrogencarbonate were used. The organoleptic evaluation was conducted by the 10point evaluation method. Thus, it was found that concerning Control products 1 and 2, both the elasticity and the glutinousness were liable to decrease, whereas concerning the use of the transglutaminase and sodium hydrogencarbonate combined (inventive product), the elasticity and the glutinousness and also the flexibility were maintained.

Example 2 (Prevention of browning, and restorability of instant Chinese noodles)

With respect to the four types of instant Chinese noodles produced in (a) of Example 1, the browning was examined as follows. That is, the results given when the noodles were stored at 44° C. and a humidity of 78% for 3 months (corresponding to storage at room temperature for 1 year) are shown in Table 4 below.

TABLE 4

|  | 3 months at 44° C. and a humidity of 78% (corresponding to 1 year at room temperature) L value |
| --- | --- |
| Control product 1 | 62.0 |
| Control product 2 | 60.3 |

TABLE 4-continued

|  | 3 months at 44° C. and a humidity of 78% (corresponding to 1 year at room temperature) L value |
|---|---|
| Control product 3 | 68.8 |
| Inventive product | 70.4 |

In the above table, the L value refers to a brightness measured with a differential colorimeter. The larger the value, the brighter the color, which, in turn, means that the degree of browning is low.

Further, the restorability in hot water 3 minutes after the pouring of hot water onto the products stored for 3 months and the firmness thereof were evaluated. The results are shown in Table 5 below.

TABLE 5

|  | Starting at 5° C. | | Products stored for 3 months (corresponding to 1 year at room temperature) | |
|---|---|---|---|---|
|  | Restorability in hot water | Organoleptic evaluation | Restorability in hot water | Organoleptic evaluation |
| Control product 1 | x | 5 points | x | 2 points |
| Control product 2 | x | 4 points | x | 3 points |
| Control product 3 | ○ | 8 points | ◎ | 7 points |
| Inventive product | ◎ | 9 points | ◎ | 8 points |

The indication of the restorability in hot water is:

x : The restorability in hot water is bad and the core remains.

○: The restorability in hot water is good and the firmness is provided.

Δ: The restorability in hot water is good but the product is slightly soft.

◎: The restorability in hot water is good, the firmness is provided, and a good texture is obtained.

As is apparent from the results shown in the above table, the inventive product exhibited a preferable texture also after the storage.

Example 3 (Decrease in oil absorption rate of instant Chinese noodles)

Four types of raw Chinese noodles produced in the same manner as in (a) of Example 1 were respectively steamed for 2 minutes, and thereafter fried at 60° C. for 1 minutes and then at 165° C. for 2 minutes to produce instant Chinese noodles. With respect to these noodles, the oil absorption rate ((weight) ratio of the oil based on the total weight of the product of the instant Chinese noodles) was measured, and the organoleptic evaluation was also conducted. The results are shown in Table 6 below.

TABLE 6

|  | Oil absorption rate | Organoleptic evaluation |
|---|---|---|
| Control product 1 | 23.3% | 5 pts.: The product had a firmness but was quickly softened after boiling. |
| Control product 2 | 17.6% | 6.5 pts.: The product had a firmness. |
| Control product 3 | 12.5% | 7.0 pts.: The product had a high firmness and a glutinousness. |
| Inventive product | 10.5% | 8.2 pts.: The product had a high firmness and a glutinousness, and softening was inhibited. |

As is apparent from the results shown in the above-mentioned table, the oil content of the inventive product tends to be decreased by approximately 50% in comparison with the control products, and it is thus useful as healthy fried noodles.

Example 4 (Raw udon noodles)

Two-thousand grams of medium wheat flour ("Kin Suzuran", supplied by Nisshin Flour Milling Co., Ltd.) and a solution of 60 g of sodium chloride dissolved in 820 g of water which solution was mixed with "Activa" (specific activity: 1,000 units/g), an enzyme preparation of a trans-glutaminase supplied by Ajinomoto Co., Inc. and sodium hydrogencarbonate in amounts shown in Table 7, were kneaded or mixed under a vacuum of 500 mmHg for 7 minutes using a mixer for producing noodles (vacuum kneader, "TVM 03-0028 Model" ex K.K. Tokyo Menki), whereby six types of udon doughs were obtained. Then, the udon doughs were sheeted, combined and rolled in a usual manner (dough sheets), and then aged at 20° C. for 60 minutes. The final udon strands were cut out from the dough sheets with a width of 2.5 mm using a cutting roll No. 12 to produce raw udon noodles.

TABLE 7

| Dough No. | Transglutaminase Unit/g-wheat protein | Sodium hydrogencarbonate % (based on wheat flour) |
|---|---|---|
| Control product 1 | 0 | 0 |
| Control product 2 | 0 | 0.5 |
| Control product 3 | 5 | 0 |
| Inventive product 1 | 5 | 0.5 |
| Inventive product 2 | 5 | 1.0 |
| Inventive product 3 | 5 | 2.0 |

These raw udon noodles were boiled for 12 minutes, and the organoleptic evaluation was conducted by a panel of 10 expert panelists according to the 10-point evaluation method. To explain in detail, the elasticity, the glutinousness (Japanese mochi-mochi feeling) and the flexibility (smoothness) which are important points of the texture of Japanese udons were employed as evaluation items, and the evaluation was conducted upon laying stress on these items. Incidentally, boiled udon noodles were evaluated not immediately after the boiling but 30 minutes after the boiling. The results of the evaluation are shown in Table 8 below.

TABLE 8

|  | Elasticity (pts.) | Glutinousness (pts.) | Flexibility (pts.) | Overall evaluation (pts.) | Profile evaluation |
|---|---|---|---|---|---|
| Control product 1 | 3.0 | 2.5 | 2.5 | 2.5 | Soft and broken |
| Control product 2 | 3.0 | 3.5 | 3.0 | 3.8 | Soft and glutinous |
| Control product 3 | 5.0 | 2.8 | 3.0 | 5.6 | Elastic but less glutinous |
| Inventive product 1 | 6.2 | 5.8 | 6.0 | 6.2 | Elastic and glutinous |
| Inventive product 2 | 7.2 | 6.0 | 6.5 | 7.3 | Elastic and smooth |
| Inventive product 3 | 7.7 | 6.8 | 7.0 | 8.1 | Elasticity and glutinousness were good. |

In comparison with the control products 1 to 3, the inventive products 1 to 3 with transglutaminase and sodium hydrogencarbonate used, were all increased in elasticity, glutinousness and flexibility which are characteristics of Japanese udon noodles.

Further, the udon noodles immediately after the boiling were allowed to stand overnight in a refrigerator at 10° C., and then subjected to the organoleptic evaluation in the above-mentioned manner by the above-mentioned panel of expert panelists. Consequently, the same effects as mentioned above were obtained.

Example 5 (Instant udon noodles)

Six types of raw udon noodles produced in the same manner as in Example 4 were respectively steamed for 2 minutes, and cooked in oil at 65° C. for 1.5 minutes and immediately at 165° C. for 2 minutes to obtain six types of instant udons. These instant udons were subjected to the same organoleptic evaluation by the panel of 10 panelists as in Example 4. The results of the evaluation are shown in Table 9 below.

TABLE 9

|  | Elasticity (pts.) | Glutinousness (pts.) | Flexibility (pts.) | Overall evaluation (pts.) | Profile evaluation |
|---|---|---|---|---|---|
| Control product 1 | 4.0 | 3.5 | 3.0 | 3.5 | Very soft |
| Control product 2 | 3.2 | 3.0 | 3.5 | 3.5 | Soft |
| Control product 3 | 3.0 | 2.5 | 2.0 | 3.8 | Elastic |
| Inventive product 1 | 5.5 | 6.0 | 6.0 | 5.5 | Elastic and flexible |
| Inventive product 2 | 5.5 | 6.5 | 6.5 | 6.5 | Elastic and flexible |
| Inventive product 3 | 6.0 | 7.5 | 7.0 | 7.0 | Elasticity, glutinousness and firmness are high. |

As is apparent from the above-mentioned table, the same evaluation was obtained with respect to the instant udons as well. That is, in comparison with the control products, the inventive products all gave a preferable feeling upon eating with a good balance between elasticity and glutinousness.

Example 6 (Raw and LL (long-life) Chinese noodles)

(a) Two-thousand grams of semi-strong wheat flour ("Toku No. 1", supplied by Nisshin Flour Milling Co., Ltd.) and a solution in 800 g of water, of 20 g of sodium chloride, sodium hydrogencarbonate, a transglutaminase (specific activity: 1,000 units/g) derived from a microorganism (Streptoverticillium mobaraense IFO 13819) belonging to the genus Streptoverticillium, an actinomycetes, and a wheat protein partial hydrolyzate "Glutamine Peptide" (supplied by DMV Japan), the last three being in amounts shown in Table 10 below, were kneaded with a mixer at 76 rpm for 15 minutes. The mixture was sheeted, combined, and rolled using a noodle-making machine (supplied by K.K. Shinagawa Menki Seisakusho). Thereafter, the sheet dough was aged at 20° C. for 60 minutes, and then cut out with a cutting roll No. 22 to produce seven types of raw Chinese noodles.

TABLE 10

|  | Transglutaminase unit/g wheat protein | Sodium hydrogencarbonate % (based on wheat flour) | Glutamine Peptide % (based on wheat flour) |
|---|---|---|---|
| Control product 1 | 0 | 0.7 | 0 |
| Control product 2 | 0 | 0 | 0.3 |
| Control product 3 | 5 | 0 | 0 |
| Inventive product 1 | 5 | 0.7 | 0 |
| Inventive product 2 | 5 | 0 | 0.3 |
| Inventive product 3 | 5 | 0.7 | 0.3 |
| Inventive product 4 | 10 | 2.0 | 0.3 |

The resulting seven types of raw Chinese noodles were respectively boiled for 2.5 minutes, and then allowed to stand in a Chinese noodle soup at 90° C. for 15 minutes. Then the thus treated noodles were evaluated by tasting. The results are shown in Table 11.

The organoleptic evaluation here was conducted by a panel of 20 expert panelists according to the 10-point evaluation method. That is, with respect to the "elasticity", the evaluation was conducted by each panelist according to the standard, based on 5 points: standard, 1 point: very soft, 2 points: fairly soft, 3 points: comparatively soft, 4 points: slightly soft, 6points: slightly hard, 7points: comparatively hard, 8 points: hard, 9points: fairly hard, and 10 points: very hard. The average values thereof were employed. Further, with respect to the "glutinousness" and the "overall evaluation", the same evaluation was conducted. At the same time, the profile evaluation was also conducted.

TABLE 11

|  | Elasticity (pts.) | Glutinousness (pts.) | Overall Evaluation (pts.) | Profile evaluation |
|---|---|---|---|---|
| Control product 1 | 3.0 | 1.5 | 2.0 | Soft |
| Control product 2 | 3.0 | 2.0 | 2.5 | Soft and non-elastic |
| Control product 3 | 3.0 | 2.0 | 2.0 | Soft and somewhat brittle |
| Inventive product 1 | 5.0 | 5.5 | 5.5 | Somewhat elastic |
| Inventive product 2 | 5.5 | 5.5 | 6.0 | Elastic |
| Inventive product 3 | 7.0 | 7.0 | 7.0 | Elastic, glutinous and flexible |

TABLE 11-continued

| Dough No. | Elasticity (pts.) | Glutinousness (pts.) | Overall Evaluation (pts.) | Profile evaluation |
|---|---|---|---|---|
| Inventive product 4 | 7.0 | 6.5 | 7.0 | Elastic and glutinous |

(b) Further, seven types of raw Chinese noodles obtained in the above-mentioned manner were respectively boiled for 1 minute, and dipped in a 0.75% lactic acid solution, whereby the noodle strands were adjusted to a pH of 4.2 or less, then packed in a package pouch, and heat-sterilized at 90° C. for 35 minutes. They were then subjected to the organoleptic evaluation. When sodium hydrogencarbonate (carbonate) or/and "Glutamine Peptide" (protein partial hydrolyz ate) were used in addition to the transglutaminase, the best results were obtained as in the evaluation after the boiling treatment in the above-mentioned (a). The results are shown in Table 12.

TABLE 12

| Dough No. | Elasticity | Glutinousness | Overall Evaluation | Comments |
|---|---|---|---|---|
| Control product 1 | 2.0 | 1.5 | 2.0 | Soft and brittle |
| Control product 2 | 2.0 | 2.0 | 2.5 | Soft and non-elastic |
| Control product 3 | 2.0 | 2.0 | 2.0 | Soft and flexible |
| Inventive product 1 | 5.5 | 6.0 | 5.5 | Somewhat elastic |
| Inventive product 2 | 6.0 | 5.5 | 6.0 | Elastic and flexible |
| Inventive product 3 | 6.0 | 6.5 | 6.5 | Elastic, glutinous and flexible |
| Inventive product 4 | 6.0 | 6.0 | 6.0 | Elastic, glutinous and flexible |

Example 7 (Spaghetti and macaroni)

(a) Two-thousand grams of durum semolina flour ("Leone B", supplied by Nissin Flour Milling Co., Ltd.) and a solution in 600 g of tap water, of the same transglutaminase as that used in Example 1, sodium hydrogencarbonate and a gliadin-containing composition "Glia A" (supplied by Asama Kasei K.K.), the last three being in amounts shown in Table 13, were mixed or kneaded for 10minutes using a past a machine ("TYPE PM 50" ex Lucky Caffee Machine) to form a spaghetti dough. Then, it was aged at 30° C. for 40 minutes, and extruded to obtain four types of raw spaghetti. Each was dried at a temperature of 35° C. and a humidity of 70% for 4 hours using a constant-temperature drier to obtain dry spaghetti. By the way, gliadin is one component of a protein.

TABLE 13

| Dough No. | Transglutaminase unit/g-wheat protein | Sodium hydrogencarbonate % (based on wheat flour) | Gliadin-containing composition % (based on wheat flour) |
|---|---|---|---|
| 1 (Control product 1) | 0 | 0 | 0 |
| 2 (Control product 2) | 0 | 1.0 | 0 |

TABLE 13-continued

| Dough No. | Transglutaminase unit/g-wheat protein | Sodium hydrogencarbonate % (based on wheat flour) | Gliadin-containing composition % (based on wheat flour) |
|---|---|---|---|
| 3 (Inventive product 1) | 10 | 1.0 | 0 |
| 4 (Inventive product 2) | 10 | 1.0 | 2.0 |

Each type was boiled in boiling water for 8 minutes, and subjected to the organoleptic evaluation by a panel of 20 expert panelists. The evaluation was conducted by the 10-point evaluation method. The results are shown in Table 14 below.

TABLE 14

| Dough No. | Glutinousness (pts.) | Elasticity (pts.) | Overall Evaluation (pts.) | Comments |
|---|---|---|---|---|
| 1 | 3.0 | 3.0 | 3.0 | Slightly soft |
| 2 | 3.5 | 3.5 | 3.0 | Non-elastic |
| 3 | 5.5 | 6.0 | 6.5 | Elastic and glutinous |
| 4 | 7.5 | 8.0 | 7.5 | Elastic and preferable |

As is apparent from the above-mentioned table, in comparison with the control products, the inventive products had an excellent texture with a good balance between elasticity and glutinousness.

Example 8 (buck wheat noodles)

1,600 g of buck wheat flour ("Heiwa", supplied by Hokuto Seifun K.K.), 400 g of strong wheat flour ("Seikei", supplied by Nisshin Flour Milling Co., Ltd.) and a solution in 720 g tap water, of 20 g of sodium chloride, the same transglutaminase (specific activity: 1,000 units/g) as that used in Example 1, sodium hydrogencarbonate and yeast extract ("Yeast Extract GS", supplied by Kohjin Co., Ltd.) as a glutathione source, the last three being in amounts shown in Table 15 below, were kneaded at 75 rpm for 10 minutes using a mixer ("TVM 03-0028 Model", supplied by Tokyo Menki K.K.). The mixture was then sheeted, combined, and rolled in a usual manner using a noodle-making machine (supplied by K.K. Shinagawa Seimenki). Thereafter, the resulting dough sheet was aged at 20° C. for 60 minutes, and then cut out with a cutting roll No. 24 to produce five types of raw Japanese soba noodles.

TABLE 15

| | Transglutaminase Unit/g | Sodium hydrogencarbonate % | "Yeast Extract GS" % |
|---|---|---|---|
| Control product 1 | 0 | 0 | 0 |
| Control product 2 | 0 | 0.3 | 0 |
| Inventive product 1 | 5 | 0.3 | 0 |
| Inventive product 2 | 5 | 0.3 | 0.5 |

TABLE 15-continued

| | Transglutaminase Unit/g | Sodium hydrogen-carbonate % | "Yeast Extract GS" % |
|---|---|---|---|
| Inventive product 3 | 5 | 0.3 | 1.0 |

Each product was boiled in boiling water for 3.5 minutes, and then subjected to the organoleptic evaluation with a panel of 20 expert panelists. The evaluation was conducted by the 10-point evaluation method. The results are shown in Table 16 below.

TABLE 16

| Dough No. | Gluti-nousness (pts.) | Elast-icity (pts.) | Overall evaluation (pts.) | Comments |
|---|---|---|---|---|
| Control product 1 | 3.0 | 3.0 | 3.0 | Soft |
| Control product 2 | 3.5 | 3.0 | 3.0 | Slightly glutinous |
| Inventive product 1 | 5.0 | 6.0 | 6.0 | Elastic and glutinous |
| Inventive product 2 | 6.5 | 7.0 | 7.5 | Glutinousness and elasticity were well-balanced. |
| Inventive product 3 | 7.3 | 8.2 | 8.0 | Elastic with good teeth cutting |

In comparison with the control products, the inventive products gave a feeling upon eating having a good elasticity and easy to teeth-cut peculiar to Japanese soba in combination with a good balance between glutinousness and elasticity. Further, softening after boiling was prevented. When the product was used as a noodle lunch or the like, the firmness was maintained for a long period of time, which means the product was an optimum one.

Example 9 (LL spaghetti)

Two-thousand grams of durum semolina flour ("Leone B", supplied by Nissin Flour Milling Co., Ltd.) and a solution in 600 g of tap water, of the same transglutaminase as that used in Example 1, "Yeast Extract GS" and "Glutamine Peptide", the last three being in amounts shown in Table 17, were mixed or kneaded for 10 minutes using a pasta machine ("TYPE PM 50" ex Lucky Caffee Machine), and immediately extrusion-molded to form five types of spaghetti dough cut to 30 cm.

TABLE 17

| Dough No. | Trans-glutaminase unit/g-wheat protein | "Yeast Extract GS" % (based on wheat flour) | "Glutamine Peptide" % (based on wheat flour) |
|---|---|---|---|
| Control product 1 | 0 | 0 | 0 |
| Control product 2 | 5 | 0 | 0 |
| Control product 3 | 0 | 0.2 | 0 |
| Inventive product 1 | 5 | 0.2 | 0 |
| Inventive product 2 | 5 | 0.2 | 0.4 |

The thus-obtained five kinds of spaghetti were respectively pre-boiled for 5 minutes, cooled and then dipped in a 0.7% lactic acid solution for 4 minutes. Subsequently, each of these was filled in a pack (heat-resistant three-layered polyethylene bag, 140 mm×115 mm), and heat-sterilized at 95° C. for 30 minutes to obtain five types of LL spaghetti.

Hot water was poured onto the thus-obtained respective LL spaghettis. One minute later, the hot water was drained, and the LL spaghettis were subjected to the organoleptic evaluation by a panel of 20 panelists in the same manner as in Example 6. The results are shown in Table 18 below.

TABLE 18

| Dough No. | Gluti-nousness (pts.) | Elast-icity (pts.) | Overall evaluation (pts.) | Comments |
|---|---|---|---|---|
| Control product 1 | 3.0 | 3.0 | 3.0 | Soft |
| Control product 2 | 5.0 | 7.0 | 5.3 | Slightly hard but less glutinous |
| Control product 3 | 5.5 | 3.5 | 3.8 | Glutinous but less elastic |
| Inventive product 1 | 7.2 | 7.5 | 7.3 | Elasticity and glutinousness were both good. |
| Inventive product 2 | 7.5 | 8.0 | 8.2 | Elasticity and glutinousness were well-balanced. |

As shown in Table 18, in comparison with the control products, the inventive products exhibited a high firmness, and were increased in both glutinousness and elasticity, providing a desirable texture.

Example 10 (Boiled udon noodles)

Three-thousand grams of medium wheat flour ("Kin Suzuran", protein content: 8.5%, supplied by Nisshin Flour Milling Co., Ltd.) was mixed with a solution of 90 g of sodium chloride in 1,140 g of water which solution was added with a transglutaminase (specific activity: 1,000 units/g), "Glutamine Peptide", sodium hydrogencarbonate and yeast extract in various amounts shown in Table 19. Six types of udon noodles were produced from the mixture in a usual manner under the same conditions as in Example 4.

TABLE 19

Boiled udon noodles

| Dough No. | Trans-glutaminase unit/g-wheat protein | Glutamine Peptide % (based on wheat flour) | Sodium hydrogen-carbonate % (based on wheat flour) | Yeast extract % (based on wheat flour) |
|---|---|---|---|---|
| Control product 1 | 0 | 0 | 0 | 0 |
| Control product 2 | 5 | 0 | 0 | 0 |
| Control product 3 | 0 | 0.5 | 0 | 0 |
| Inventive product 1 | 5 | 0.5 | 0 | 0 |
| Inventive product 2 | 5 | 0.5 | 0.2 | 0 |
| Inventive product 3 | 5 | 0.5 | 0.2 | 0.25 |

These were boiled for 12 minutes to obtain boiled udon noodles, and the boiled udon noodles were subjected to the organoleptic evaluation by a panel of 20 expert panelists as in Example 6. The results are shown in Table 20 below.

TABLE 20

Organoleptic evaluation of boiled udon noodles

| Dough No. | Gluti-nousness (pts.) | Elast-icity (pts.) | Overall evaluation (pts.) | Comments |
|---|---|---|---|---|
| Control product 1 | 3.0 | 3.0 | 3.0 | Soft |
| Control product 2 | 4.6 | 6.8 | 5.8 | Elasticity was slightly strong. |
| Control product 3 | 4.8 | 3.0 | 4.0 | Glutinous |
| Inventive product 1 | 7.2 | 7.1 | 7.5 | Elasticity and glutinousness were well-balanced. |
| Inventive product 2 | 7.7 | 8.0 | 8.0 | Elasticity and glutinousness were both strong. |
| Inventive product 3 | 8.0 | 8.9 | 8.7 | Elasticity and glutinousness were both strong. |

As shown in Table 20, in comparison with the control products, the inventive products were boiled udon noodles which were strong with respect to both the glutinousness and elasticity, which was controlled in boil-softening even after the lapse of time and which had an improved texture.

Example 11 (Chilled boiled udon noodles)

Six types of udon noodles obtained by using the same auxiliary materials as in Example 10 were pre-boiled for 8 minutes, then immediately cooled, filled in packs, and stored in a refrigerator at 8° C. for 4 hours to produce chilled boiled udon noodles. The thus-obtained chilled boiled udon noodles) were re-boiled for 2 minutes, and subjected to the organoleptic evaluation by a panel of 20 expert panelists as in Example 6. The results are shown in Table 21.

TABLE 21

Organoleptic evaluation of chilled boiled udon

| Dough No. | Gluti-nousness (pts.) | Elast-icity (pts.) | Overall evaluation (pts.) | Comments |
|---|---|---|---|---|
| Control product 1 | 2.1 | 2.0 | 2.0 | Fairly soft |
| Control product 2 | 4.1 | 5.9 | 5.1 | Slightly elastic. |
| Control product 3 | 4.0 | 2.6 | 3.2 | Soft |
| Inventive product 1 | 6.8 | 7.0 | 7.2 | Elasticity and glutinousness were well-balanced. |
| Inventive product 2 | 7.6 | 7.7 | 7.9 | Elasticity and glutinousness were both strong. |
| Inventive product 3 | 7.7 | 8.0 | 8.3 | Elasticity and glutinousness were both strong. |

As shown in Table 21, in comparison with the control products, the inventive products were strong with respect to both elasticity and glutinousness, and had a well-balanced desirable texture with the firmness retained.

Effects of the Invention

In accordance with the present invention, a transglutaminase and carbonate and/or a reducing agent and optionally, a protein partial hydrolyzate are allowed to act on cereal flour, whereby noodles having an elasticity and a glutinousness which have not been provided so far can be produced.

What is claimed is:

1. An enzyme preparation comprising, as the active ingredients, (1) a transglutaminase, and (2) a reducing agent in an amount of from 0.00001 g to 1 g per one unit of the transglutaminase; or a carbonate in an amount of from 0.0001 g to 30 g per one unit of the transglutaminase and a reducing agent in an amount of from 0.00001 g to 1 g per one unit of the transglutaminase; and a cereal flour.

2. The enzyme preparation of claim 1 which further contains a protein partial hydrolyzate.

3. The enzyme preparation of claim 1 or 2, which further contains a pH adjusting agent.

4. A process for producing noodles, which comprises mixing (1) a transglutaminase and (2) a reducing agent; or a carbonate and a reducing agent, and (3) cereal flour.

5. The process for producing noodles of claim 4, which further comprises mixing a protein partial hydrolyzate.

6. The process for producing noodles of claim 4, wherein the dough sheet is aged or rested at a temperature of 0–60° C. for at least 15 minutes.

7. The process of producing noodles of claim 4, wherein the noodles are subjected to a treatment selected from the group consisting of boiling, drying, steaming, frying, and acid treatment.

8. The process of producing noodles of claim 4 wherein the noodles are subjected to two-step frying, first at a low temperature then at an elevated temperature.

9. The process for producing noodles of claim 4, wherein the transglutaminase is used in an amount of 0.01–30 units per one gram of the protein present in the starting cereal flour.

10. The process of claim 4, wherein the carbonate is added in an amount from 0.0001 to 30 grams per one unit of transglutaminase.

11. The process of claim 4, wherein the reducing agent is added in an amount from 0.001 to 2.0% by weight based on the cereal flour.

12. The process of claim 5, wherein said protein partial hydrolyzate is in an amount from 0.00001 to 10 grams per one unit of transglutaminase.

13. The process of claim 8, wherein said low temperature is from 15 to 80° C. and said elevated temperature is from 105 to 190° C.

* * * * *

UNITED STATES PATENT AND TRADEMARK OFFICE
CERTIFICATE OF CORRECTION

PATENT NO.    : 6,432,458 B1
DATED         : August 13, 2002
INVENTOR(S)   : Yamazaki et al.

It is certified that error appears in the above-identified patent and that said Letters Patent is hereby corrected as shown below:

<u>Column 5,</u>
Line 23, "thichening" should read -- thickening --;
Line 50, "sodiu" should read -- sodium --;
Line 51, "phat[0085] can be mentioned" should read -- phate can be mentioned --;
Line 60, "texture to, for example, various" should read -- texture to various --.

<u>Column 7,</u>
Line 2, "give[008e] undesir-" should read -- given undesir- --.

<u>Column 8,</u>
Line 46, "above-mentioned (d))" should read -- above-mentioned (d)). --;
Line 58, "will illustrated" should read -- well be illustrated --.

<u>Column 11,</u>
Line 61, "minutes" (second occurrence) should read -- minute --.

<u>Column 14,</u>
Line 47, "9points" should read -- 9 points --.

Signed and Sealed this

Tenth Day of June, 2003

JAMES E. ROGAN
*Director of the United States Patent and Trademark Office*